US009553989B1

(12) United States Patent
Boutcher et al.

(10) Patent No.: US 9,553,989 B1
(45) Date of Patent: *Jan. 24, 2017

(54) METHOD AND COMPUTER READABLE MEDIUM FOR GEOGRAPHIC AGENT ROUTING

(71) Applicant: Alorica Business Solutions, LLC, Irvine, CA (US)

(72) Inventors: James K. Boutcher, Omaha, NE (US); Michael Todd Mateer, Omaha, NE (US); Craig A. Webster, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,663

(22) Filed: Jun. 7, 2013

Related U.S. Application Data (63) Continuation of application No. 13/115,297, filed on May 25, 2011, now Pat. No. 8,472,609, which is a continuation of application No. 11/421,846, filed on Jun. 2, 2006, now Pat. No. 7,961,866.

(51) Int. Cl.
*H04M 3/00* (2006.01)
*H04M 3/523* (2006.01)

(52) U.S. Cl.
CPC .................. *H04M 3/5232* (2013.01)

(58) Field of Classification Search
USPC ............... 379/265.01, 265.1, 265.11–265.12
See application file for complete search history.

(56) References Cited

U.S. PATENT DOCUMENTS

| 4,694,483 | A  | 9/1987 | Cheung |
| 5,036,535 | A  | 7/1991 | Gechter et al. |
| 5,619,557 | A  | 4/1997 | Van Berkum |
| 5,646,987 | A  | 7/1997 | Gerber et al. |
| 5,894,512 | A  | 4/1999 | Zenner |
| 5,940,497 | A  | 8/1999 | Miloslavsky |
| 5,953,332 | A  | 9/1999 | Miloslavsky |
| 6,055,307 | A  | 4/2000 | Behnke et al. |
| 6,222,919 | B1 | 4/2001 | Hollatz et al. |
| 6,347,139 | B1 | 2/2002 | Fisher et al. |
| 6,510,221 | B1 | 1/2003 | Fisher et al. |
| 6,535,600 | B1 | 3/2003 | Fisher et al. |
| 6,546,087 | B2 | 4/2003 | Shaffer et al. |
| 6,553,114 | B1 | 4/2003 | Fisher et al. |
| 6,603,854 | B1 | 8/2003 | Judkins et al. |

(Continued)

*Primary Examiner* — Rasha Al Aubaidi (57) ABSTRACT

A method and computer readable medium for routing a call to geographically dispersed agents based on agent skill-set, agent location and caller location that results in the call being delivered to the best available agent. The computer readable medium and method are utilized with a system comprised of a call center application module coupled to a database module with a communications network being used to couple incoming calls from customers with the best available agent. A database contains a ranking of available agents, based on a dataset including information regarding skill-set, previous interaction with the customer, proximity to the customer, language capability, current availability, and the like. The method chooses the best available agent to service a customer call based on the agent rankings. In the case where the customer has a preference for proximity of the agent to the customer, the system adjusts the agent rankings according to the agent's distance from the customer prior to making a selection.

18 Claims, 7 Drawing Sheets

(56) References Cited

U.S. PATENT DOCUMENTS

| | | |
|---|---|---|
| 6,744,878 B1 | 6/2004 | Komissarchik et al. |
| 2003/0099343 A1 | 5/2003 | Dezonno |
| 2003/0161463 A1 | 8/2003 | Galvin |
| 2004/0042612 A1 | 3/2004 | Michelson et al. |
| 2005/0195960 A1 | 9/2005 | Shaffer et al. |
| 2007/0133781 A1 | 6/2007 | Febonio et al. |

|  | 60 | 62 | 64 | 66 | 68 |
|---|---|---|---|---|---|
|  | Agent | Ranking | Distance | Adjustment | Final Ranking |
| 70 | Jim | 15 | 20 | 0.0 | 15.0 |
| 72 | Tom | 39 | 120 | 12.0 | 27.0 |
| 74 | Joe | 20 | 230 | 7.3 | 12.7 |
| 76 | Mary | 18 | 250 | 6.4 | 11.6 |
| 78 | Frank | 20 | 501 | 0.0 | 20.0 |

Congiguration
- 80 —— PPF = 50%
- 82 —— ARP = 100-500
- 84 —— ARR = 24
- 86 —— ARP Delta = 400
- 87 —— Min Distance in ARP = 120
- 88 —— ADS = 280

Configuration 1

Fig. 3

|  | 90 | 92 | 94 | 96 | 98 |
|---|---|---|---|---|---|
|  | Agent | Ranking | Distance | Adjustment | Final Ranking |
| 100 | Jim | 15 | 20 | 0.0 | 15.0 |
| 102 | Tom | 39 | 120 | 24.0 | 15.0 |
| 104 | Joe | 20 | 230 | 14.6 | 5.4 |
| 106 | Mary | 18 | 450 | -4.3 | 22.3 |
| 108 | Frank | 20 | 501 | 0.0 | 20.0 |

Congiguration
- 110 —— PPF = 100%
- 112 —— ARP = 100-500
- 114 —— ARR = 24
- 116 —— ARP Delta = 400
- 117 —— Min Distance in ARP = 120
- 118 —— ADS = 280

Configuration 2

Fig. 4

|  | 120 | 122 | 124 | 126 | 128 |
|---|---|---|---|---|---|
|  | Agent | Ranking | Distance | Adjustment | Final Ranking |
| 130 | Jim | 20.3 | 20 | 0.00 | 20.3 |
| 132 | Tom | 19.5 | 120 | 0.50 | 19.0 |
| 134 | Joe | 20.1 | 230 | 0.19 | 19.9 |
| 136 | Mary | 19.9 | 250 | 0.14 | 19.8 |
| 138 | Frank | 20.4 | 450 | 0.00 | 20.4 |

Congiguration

140 ---- PPF = 50%   146 ---- ARP Delta = 300
142 ---- ARP = 100-400   147 ---- Min Distance in ARP = 120
144 ---- ARR = 1   148 ---- ADS = 180

Configuration 3

Fig. 5

|  | 150 | 152 | 154 | 156 | 158 |
|---|---|---|---|---|---|
|  | Agent | Ranking | Distance | Adjustment | Final Ranking |
| 160 | Jim | 15 | 20 | 21.6 | -6.6 |
| 162 | Tom | 39 | 120 | 17.9 | 21.1 |
| 164 | Joe | 20 | 230 | 13.8 | 6.2 |
| 166 | Mary | 18 | 250 | 13.0 | 5.0 |
| 168 | Frank | 20 | 501 | 3.7 | 16.3 |

Congiguration

170 ---- PPF = 90%   176 ---- ARP Delta = 300
172 ---- ARP = 0-600   177 ---- Min Distance in ARP = 120
174 ---- ARR = 24   178 ---- ADS = 180

Configuration 4

|       | Agent | Ranking | Distance | Adjustment | Final Ranking |
|-------|-------|---------|----------|------------|---------------|
| 260 — | Jim   | 15      | 20       | 0.0        | 15.0          |
| 262 — | Tom   | 39      | 120      | 12.0       | 27.0          |
| 264 — | Joe   | 20      | 230      | 9.4        | 10.6          |
| 266 — | Mary  | 18      | 250      | 8.9        | 9.1           |
| 268 — | Frank | 20      | 501      | 0.0        | 20.0          |

Congiguration
270 —— PPF = 50%
272 —— ARP = 100-500
274 —— ARR = 24

Configuration 1

Fig. 8

|       | Agent | Ranking | Distance | Adjustment | Final Ranking |
|-------|-------|---------|----------|------------|---------------|
| 290 — | Jim   | 15      | 20       | 0.0        | 15.0          |
| 292 — | Tom   | 39      | 120      | 24.0       | 15.0          |
| 294 — | Joe   | 20      | 230      | 18.7       | 1.3           |
| 296 — | Mary  | 18      | 450      | 8.2        | 9.8           |
| 298 — | Frank | 20      | 501      | 0.0        | 20.0          |

Congiguration
300 —— PPF = 100%
302 —— ARP = 100-500
304 —— ARR = 24

Configuration 2

Fig. 9

|       | 310<br>Agent | 312<br>Ranking | 314<br>Distance | 316<br>Adjustment | 318<br>Final Ranking |
|-------|-------|---------|----------|------------|---------------|
| 320 | Jim   | 20.3    | 20       | 0.00       | 20.30         |
| 322 | Tom   | 19.5    | 120      | 0.45       | 19.05         |
| 324 | Joe   | 20.1    | 230      | 0.33       | 19.80         |
| 326 | Mary  | 19.9    | 250      | 0.31       | 19.60         |
| 328 | Frank | 20.4    | 450      | 0.00       | 20.40         |

Congiguration
330 ---- PPF = 50%
332 ---- ARP = 100-400
334 ---- ARR = 0.9

Configuration 3

Fig. 10

|       | 340<br>Agent | 342<br>Ranking | 344<br>Distance | 346<br>Adjustment | 348<br>Final Ranking |
|-------|-------|---------|----------|------------|---------------|
| 350 | Jim   | 15      | 20       | 21.6       | -6.6          |
| 352 | Tom   | 39      | 120      | 18.0       | 21.0          |
| 354 | Joe   | 20      | 230      | 14.0       | 6.0           |
| 356 | Mary  | 18      | 250      | 13.3       | 4.7           |
| 358 | Frank | 20      | 501      | 4.3        | 15.7          |

Congiguration
360 ---- PPF = 90%
362 ---- ARP = 0-600
364 ---- ARR = 24

Configuration 4

Fig. 11

METHOD AND COMPUTER READABLE MEDIUM FOR GEOGRAPHIC AGENT ROUTING

CROSS-REFERENCE TO RELATED APPLICATIONS

The present patent application is a continuation from U.S. patent application Ser. No. 13/115,297, filed May 25, 2011, and entitled "METHOD AND COMPUTER READABLE MEDIUM FOR GEOGRAPHIC AGENT ROUTING", which is a continuation from U.S. patent application Ser. No. 11/421,846, filed Jun. 2, 2006, and entitled "METHOD AND COMPUTER READABLE MEDIUM FOR GEOGRAPHIC AGENT ROUTING", now issued U.S. Pat. No. 7,961,866, issued Jun. 14, 2011, which is incorporated by reference herein in its entirety. The present patent application is related to and has the same priority date as U.S. patent application Ser. No. 11/421,841, entitled "SYSTEM FOR GEOGRAPHIC AGENT ROUTING", now issued U.S. Pat. No. 8,009,822, issued Aug. 30, 2011, which is incorporated by reference herein in its entirety.

BACKGROUND OF THE INVENTION

The present invention relates to the general field of routing agents from call centers and in particular to a method and computer readable medium for optimally routing such agents.

The present invention comprises a method and computer readable media (or software) for routing a call or other communication to a best available individual, such as a call center agent, customer service representative, and the like, who has a certain relationship with a caller, such as, for example, a physical proximity between the individual and the caller.

Currently, many businesses utilize call centers, each with multiple agents, to provide customer service. Typically, businesses employ multiple physical call centers to enable around-the-clock call handling and to utilize cheaper labor markets. Current call center applications enable call routing by a number of methods including time-of-day (TOD), agent availability, caller location and agent skill-set. In some cases, these methods can be combined to form a routing plan. There are limitations to this approach however, including the need to group agents at certain physical locations and the strict prioritization of one routing method over another. These limitations may result in a customer who is not very comfortable with his agent due to accent, lack of local knowledge, etc.

Therefore, what is needed to overcome the aforementioned limitations, is a computer readable medium utilized in conjunction with a call center system or with a system utilized by an agent based at a residence or other non-call center location, and a call routing method for geographically dispersed agents, based on agent skill-set, agent location, and/or caller location that results in delivery of an incoming call to a best available agent, while allowing a certain preference towards agents who are geographically closer to the caller.

SUMMARY OF THE INVENTION

The present invention, accordingly, provides a computer readable medium and a method for routing calls to geographically dispersed agents based on agent skill-set, agent location and/or caller location, that results in call or non-voice message delivery to a best available agent.

In a preferred embodiment of the invention, a method chooses a best available agent to service a customer call based on the ranking of all agents. If a customer has a preference for proximity of the agent to the customer, the system adjusts the agent rankings according to their distance from the customer prior to making a selection. The method of the present invention is implemented via a call center system, which is comprised of a call center application module coupled to a database module. A communications network is used to couple incoming calls from customers, as well as various call center agents, to the system. The communications network will accommodate both static (fixed location) and dynamic (wireless) communications. A database contains a ranking of available agents based on a dataset including information regarding skill-set, previous interaction with the customer, proximity to the customer, language capability, current availability, and the like.

In operation, when a customer places a call (for example, to a system utilizing the present method and computer readable medium), he/she specifies a proximity preference factor (PPF) from 0%-100%. If the PPF is 0% then the customer does not care about the distance between the customer (caller) and the agent, then the system selects an agent solely on the initial agent ranking. However, if the customer specifies a PPF>0 with an agent range preference (ARP), then a distance adjustment is made, as follows: First, an agent ranking range (ARR) is calculated by subtracting the lowest agent ranking from the highest agent ranking. Then a distance adjustment is made for each agent within the ARP according to the formula:

$$ARR*PPF*(ARPmax+ClosestDistanceInARR-AgentDistance)/ARPmax,$$

and the final ranking is determined by subtracting the distance adjustment from the initial ranking for each agent. The agent with the lowest ranking is then assigned to service the call.

The present invention provides a fast, automated selection of the best available agent to service an incoming request based on the customer's preferences.

BRIEF DESCRIPTION OF THE DRAWINGS

The above listed and further advantages of the invention may be better understood by referring to the following description in conjunction with the accompanying drawings, in which.

DETAILED DESCRIPTION OF THE INVENTION

In the description that follows, like elements are marked throughout the specification and drawings with the same reference numerals, respectively. The drawing figures are not necessarily to scale and certain elements may be shown in generalized or schematic form in the interest of clarity and conciseness. Certain routine steps, in flow charts, normally included in the operation of the present invention have been omitted in the interest of conciseness. However, the steps which include methodology in accordance with the present invention are indicated in the charts. As is conventional, the letters Y and N designate "yes" and "no", respectively.

Figure 1:
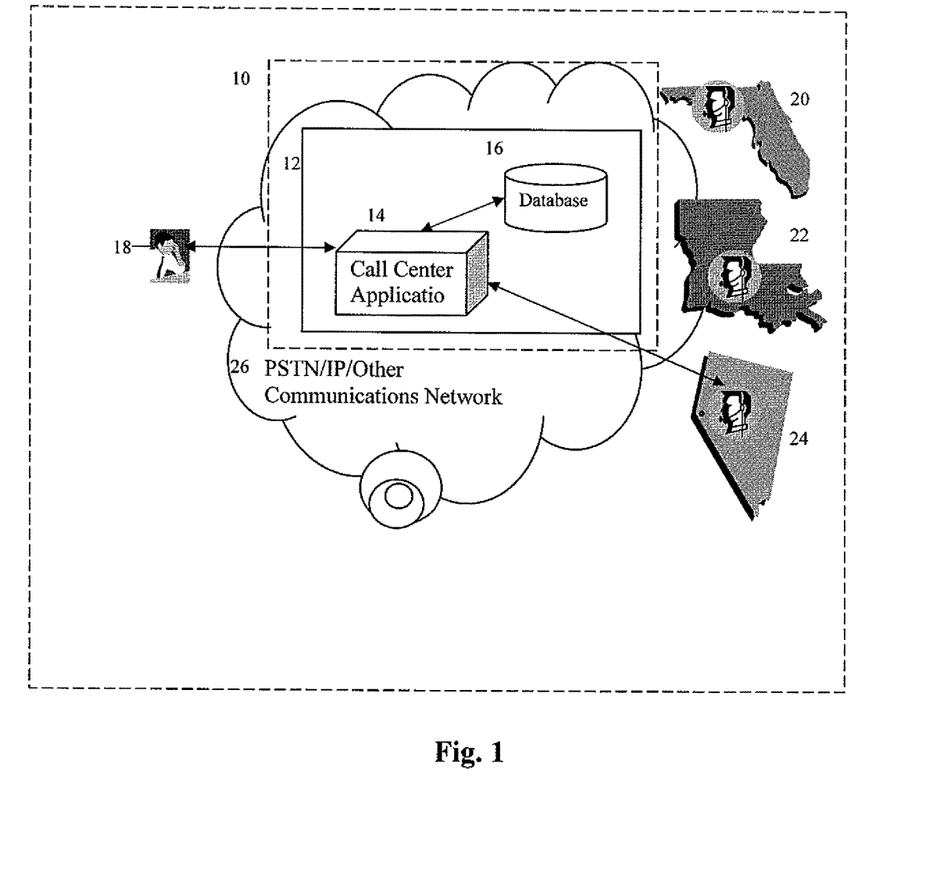
FIG. 1 depicts a call center system for implementing a first method of the present invention.

Referring now to FIG. 1, the overall system 10 for implementing a first method of the invention includes a call center system 12, which is comprised of a call center application module 14 and a database module 16 containing customer data, agent data, and the like. It should be noted that the functionality performed by the modules 14, 16 can be performed by one of these modules or by another module (not shown) that may be a part of the call center system 12 or communicate with the system 12. These modules 14, 16 may include software, hardware, firmware, and/or a combination of software, hardware, and/or firmware.

Figure 2:
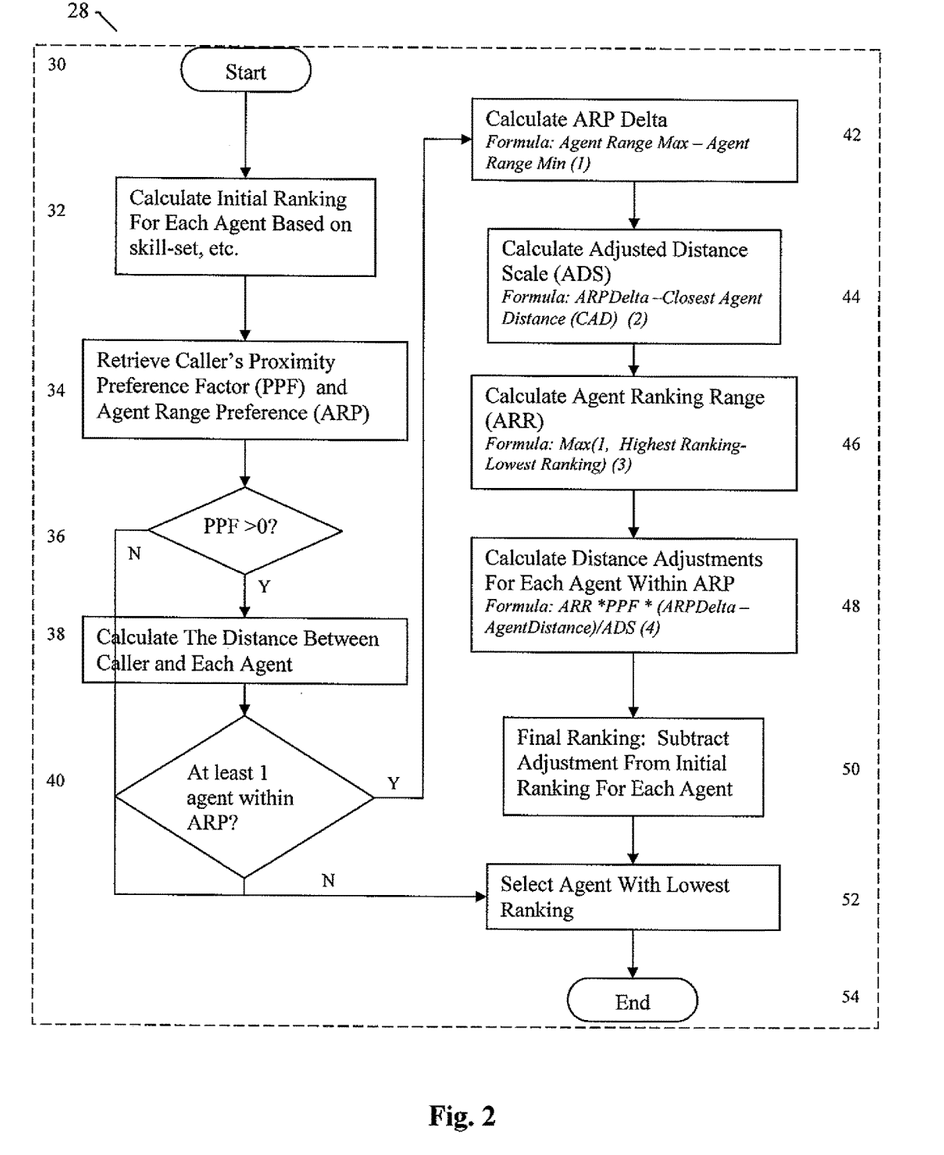
FIG. 2 depicts a flowchart illustrating the method steps for agent selection in accordance with a first embodiment of the present invention.

A customer 18, who may desire to purchase a product or a service, for example, communicates (for example, calls, emails, FAX, etc.) with a call center agent 20-24 via the call center system 12 over a communications network 26. The network 26 may be a Public Switched Telephone Network (PSTN), an Internet Protocol Network, a wired network, a wireless network, or any combination of these networks. The call center system 12 of the present invention, uses the procedure of flowchart 28, described herein, along with computer readable media of the present invention to determine the best available agent from a set of geographically dispersed agents 20-24 for servicing a customer call, and routes the call accordingly to a particular agent. For purposes of this example only, the call is depicted as being routed to agent 24.

Referring now to FIG. 2, a first agent selection procedure is implemented using a computer readable medium of the present invention. The procedure or method begins 30 by calculating 32 an initial ranking for each agent based on skill-set and/or other attributes, which include race, sex, etc.

The method proceeds by retrieving 34 two pieces of data associated with the caller. The first is a Proximity Preference Factor (PPF). This allows the caller to weight the importance of proximity in agent selection. A PPF of 100% turns even the worst agent into the best agent if they happen to be the closest. A PPF of 50% turns the worst agent who happens to be the closest to an agent better than 50% of the available agents. A PPF of 0% effectively disables distance factors in agent selection.

The second piece of retrieved data is an Agent Range Preference (ARP). This allows a customer to specify a distance range in which proximity is going to be given consideration. The ARP consists of a minimum and a maximum distance value. The minimum can be used to filter out agents who might be calling themselves. The maximum can be used to stop giving preference to agents outside a particular range. For example, an agent 2500 miles away is probably no more preferable to an agent 2600 miles away.

Once the data has been retrieved, a decision point 36 is reached. If the PPF=0, then agent distance is not a factor for this caller. Given this, the method proceeds to agent selection 52 based on the initial agent ranking.

However, if the PPF>0, then distance is a factor for this caller. Given this, a distance between the caller and each agent is calculated 38. This can be done with simple calculations that take advantage of static (address, NPA-NXX, zip code, etc.) and/or dynamic (cell site, GPS coordinates, etc.) data associated with the caller and the available agents.

Once complete, the method determines 40 if there is at least one agent whose distance falls within the ARP. If not, then the distance of the available agents is still not a factor, so the method proceeds to agent selection 52.

If there is at least one agent that falls within the ARP, then the method proceeds to calculate an ARP Delta 42. The ARP delta is the difference between the maximum and the minimum ARP distance values as shown by the formula below:

$$\text{ARP Delta} = \text{ARP Maximum} - \text{ARP Minimum} \tag{1}$$

The ARP Delta is then used to calculate 44 an Adjusted Distance Scale (ADS), which is determined by subtracting the closest agent distance (CAD) within the ARP range from the ARP Delta as shown by the formula below:

$$\text{ADS} = \text{ARP Delta} - \text{Closest Agent Distance} \tag{2}$$

The method continues by calculating 46 an Agent Ranking Range (ARR), which is determined by subtracting the lowest agent ranking from the highest agent ranking or setting the value of equal to 1 if the result of the subtraction is zero, as derived by the following formula:

$$\text{ARR} = \text{Maximum}(1, \text{High Agent Ranking} - \text{Lowest Agent Ranking}) \tag{3}$$

Once the ARP Delta, ADS and ARR have been calculated (42-46), a ranking adjustment is calculated 48 for each agent whose distance falls within the ARP. The adjustment is calculated using the formula:

$$\text{Adjustment} = \text{ARR} * \text{PPF} * (\text{ARPDelta} - \text{AgentDistance})/\text{ADS} \tag{4}$$

This formula uses the Agent Ranking Range (ARR) and the callers Proximity Preference Factor (PPF) to scale the adjustment. The closest agent will receive the largest adjustment. The furthest agent will receive the smallest adjustment.

Once the adjustments have been calculated, the method proceeds to calculate 50 the final ranking of all the agents. This calculation is performed by subtracting any adjustment from the initial ranking determined previously 32.

With the final rankings calculated, the selection ends 54 by selecting 52 the lowest ranking and therefore, the best agent.

Figure 3:
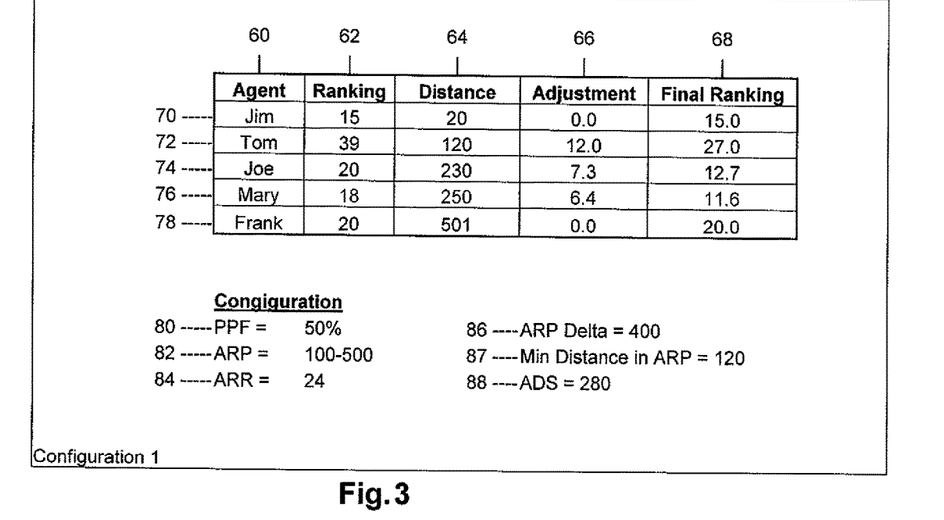
FIG. 3 depicts a first exemplary configuration in accordance with a first embodiment of the present invention.

In order to understand the benefits of the method, several applications of the invention in various caller/agent configurations will now be described. Referring now to FIG. 3, in a first exemplary configuration, the initial ranking 62 of the various agents 70-78 listed in the agent column 60 is determined as listed. Once determined, the PPF 80 and the ARP 82 submitted by the call center application are retrieved. In this case the PPF is 50% and the ARP is 100 to 500. Since the callers PPF (50%) is greater than zero, the distance 64 between the caller and each agent 70-78 is calculated.

Three agents, 72-76 are within the ARP range, so their rankings must be adjusted. To do this, the ARP Delta 86 is calculated first. As shown by the formula 1, the ARP delta is calculated by subtracting the agent range minimum from the agent range maximum. In this case, given that the maximum is 500 and the minimum is 100 (FIG. 3-82), the ARP Delta 86 is 400. The method then proceeds to calculate the ADS 88, which is calculated by formula 2. In this case, the closest agent within the range is Tom 87 at 120 miles, so the ADS 88=400−120=280.

The procedure then proceeds using formula 4 to calculate the distance adjustment 66 for each agent 72-76 within the ARP 84 range. Note that agents 70, 78 outside the ARP range receive a 0 adjustment. The adjustment values 66 are then calculated according to formula 4. Tom 72 receives the biggest adjustment, 12, as he is closest to the caller. The figure is arrived at by the following calculation of equation 4: 24*0.50*(400−120)/280=12. The ARR is 24 and 0.50 is the callers' 50% PPF. The remaining within-range agent adjustments are calculated similarly, with Joe 74 receiving an adjustment of 7.3 and Mary 76 receiving an adjustment of 6.4.

The final rankings 68 for the agents are then calculated by subtracting the adjustment value 66 from the initial ranking 62. The result in this exemplary configuration is that Mary 76 has the lowest final ranking, 11.6, and therefore is chosen as the best agent. Note that Mary is not the closest agent within the agent range preference, but the adjustment to her already low initial ranking of 18 moved her ahead of Jim, the agent with the best initial ranking.

Figure 4:
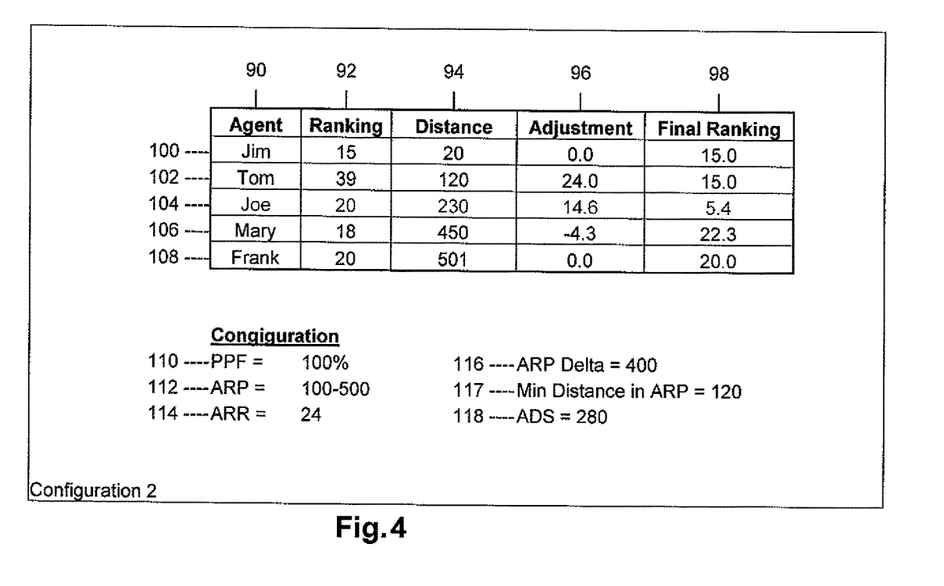
FIG. 4 depicts a second exemplary configuration in accordance with a first embodiment of the present invention.

Referring now to FIG. 4, in a second exemplary configuration, the caller's PPF 110 is now set to 100, indicating that proximity is of utmost importance to the caller. In this case, since the PPF=100, instead of 50, the PPF factor in formula 4 equals 1, instead of 0.5. Here, the ARP 112 is 100-500 so that the ARP delta 116 is 400, minimum distance within the ARP 117 is 120, the ARR 114 is 24, and the ADS 118 is 280. Again, Jim 100 and Frank 108 are outside the ARP 112 range and receive zero adjustments 96. Adjustments 96 of 24 for Tom 102, 14.6 for Joe 104, and −4.3 for Mary 106 are calculated. The resulting final rankings 98 depict that Joe has the lowest ranking and is therefore chosen as the best agent. Although Mary has a better initial ranking than Joe, Joe is closer than Mary and that is more important to the caller in this exemplary configuration.

Figure 5:
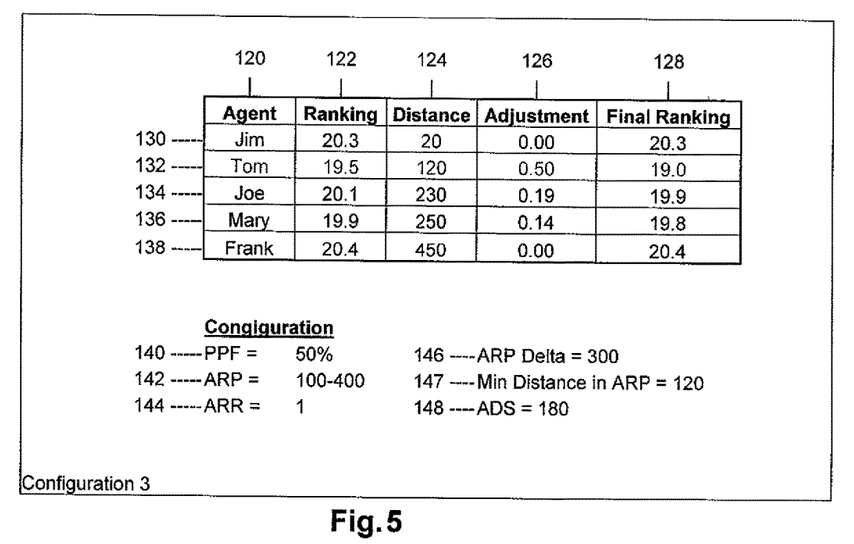
FIG. 5 depicts a third exemplary configuration in accordance with a first embodiment of the present invention.

Referring now to FIG. 5, in a third exemplary configuration, the caller's PPF 140 is again set to 50% and the ARP 142 is 100-400. However, the ranking 122 for the Agents 120 shows Jim 130 at 20.3, Tom 132 at 19.5, Joe 134 at 20.1, Mary 136 at 19.9, and Frank 138 at 20.4. Since the distances 124 for Jim 130 and Frank 138 are 20 and 450, respectively, these are outside the ARP 142 range of >100 and <400, so the adjustment for each of these two agents is set at zero. Furthermore, the ARP delta 146 is 300, the minimum distance within ARP 147 is 120, and ADS 148 is 180. In this case then, using formula (3) (ARR=Maximum (1, High Agent Ranking−Lowest Agent Ranking), the ARR 144 is calculated to be 1 as a result of the agent rankings 122 being tightly packed. This results in an adjustment 126 of 0.50 for Tom 132, 0.19 for Joe 134, and 0.14 for Mary 136. The resulting final rankings 128 depict that Tom has the lowest ranking and is therefore chosen as the best agent. In this example, Tom had both the best initial ranking and the best adjusted ranking.

Figure 6:
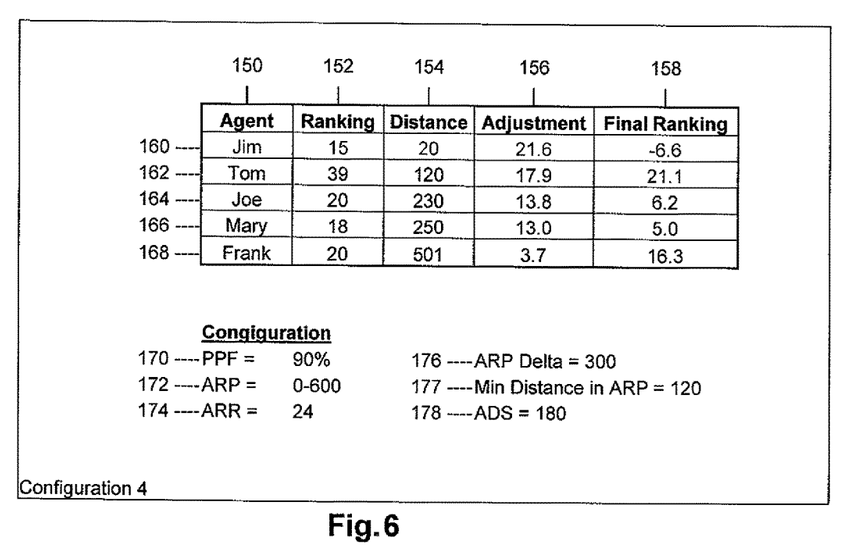
FIG. 6 depicts a fourth exemplary configuration in accordance with a first embodiment of the present invention.

Referring now to FIG. 6, a fourth exemplary configuration is shown, which has the same initial ranking 122 and distance 124 for the agents 130-138 as for the first exemplary configuration discussed in FIG. 3. However, here the caller's PPF 170 is now set to 90%, indicating that proximity is of fairly high importance to the caller, the ARP 172 is 0-600, the ARR 174 is 24, the ARP delta 176 is 600, the minimum distance in ARP 177 is 20, and the ADS 178 is 580. Although this example is much like the first exemplary configuration, now all five agents 160-168 are within the ARP 172 range and therefore need to be adjusted. In this case, since the PPF=90%, instead of 50%, the PPF factor in formula 4 equals 0.9, instead of 0.5. This results in adjustments 156 of 21.6 for Jim 160, 17.9 for Tom 162, 13.8 for Joe 164, 13.0 for Mary 166, and 3.7 for Frank 168. The resulting final rankings 158 depict that Jim 160 with and a final ranking 158 of −6.6 has the lowest ranking after adjustment and is therefore chosen as the best agent.

Figure 7:
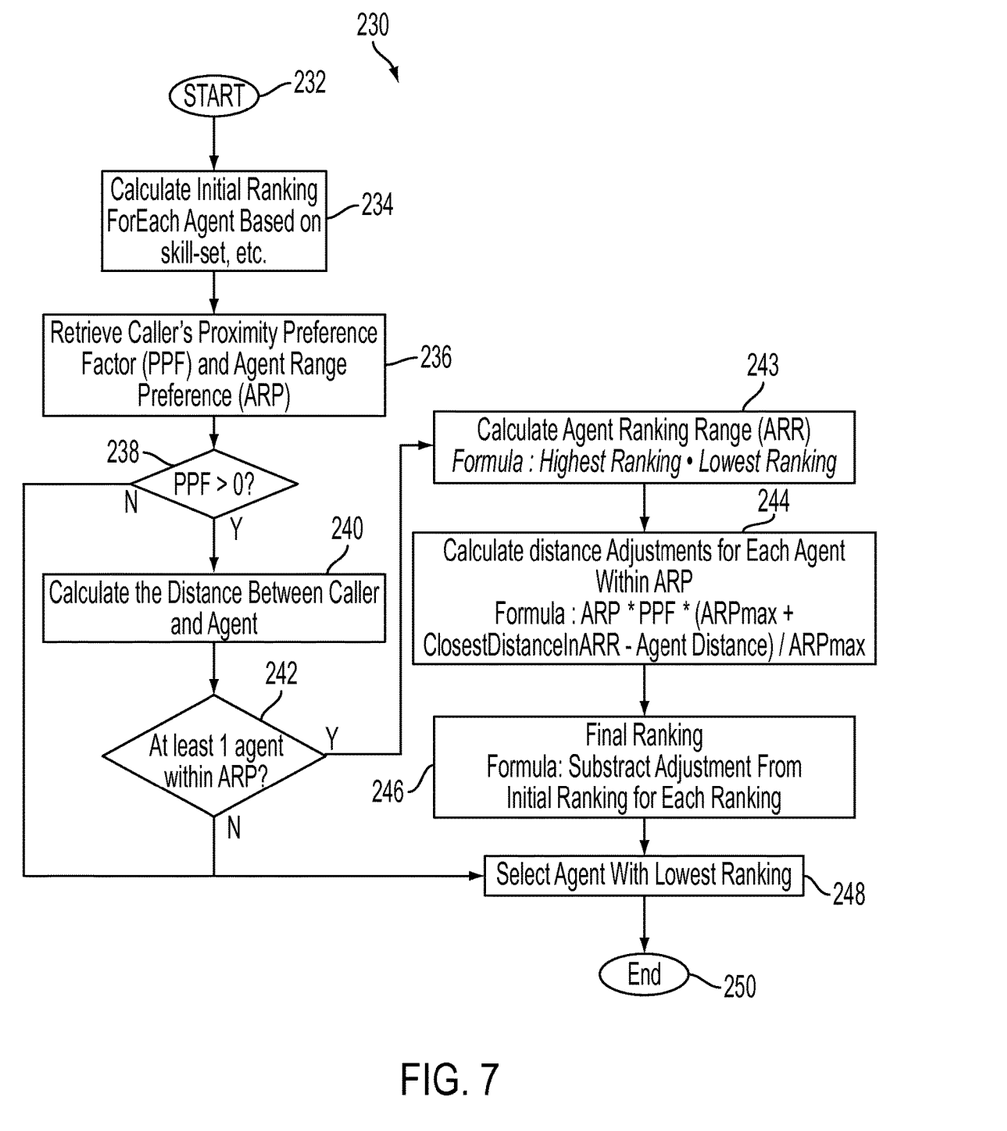
FIG. 7 depicts a flowchart for agent selection in accordance with a preferred embodiment of the present invention.

FIG. 7 shows the flowchart for a preferred embodiment of the agent selection procedure of the present invention. The method uses the procedure illustrated in flowchart 230. Here, the method begins 232 by calculating 234 an initial ranking for each agent based on skill-set and/or other attributes, which include race, sex, etc.

The method proceeds by retrieving 236 two pieces of data associated with the caller. The first is a Proximity Preference Factor (PPF). This allows the caller to weight the importance of proximity in agent selection. A PPF of 100% turns even the worst agent into the best agent if they happen to be the closest. A PPF of 50% turns the worst agent who happens to be the closest to an agent better than 50% of the available agents. A PPF of 0% effectively disables distance factors in agent selection.

The second piece of retrieved data is an Agent Range Preference (ARP). This allows a customer to specify a distance range in which proximity is going to be given consideration. The ARP consists of a minimum and a maximum distance value. The minimum can be used to filter out agents who might be calling themselves. The maximum can be used to stop giving preference to agents outside a particular range. For example, an agent 2500 miles away is probably no more preferable to an agent 2600 miles away.

Once the data has been retrieved, a decision point 238 is reached. If the PPF=0, then agent distance is not a factor for this caller. Given this, the method proceeds to agent selection 248 based on the initial agent ranking.

However, if the PPF>0, then distance is a factor for this caller. Given this, a distance between the caller and each agent is calculated 240. This can be done with simple calculations that take advantage of static (address, NPA-NXX, zip code, etc.) and/or dynamic (cell site, GPS coordinates, etc.) data associated with the caller and the available agents.

Once complete, the method determines 242 if there is at least one agent whose distance falls within the ARP. If not, then the distance of the available agents is still not a factor, so the method proceeds to agent selection 248.

However, if at least one agent falls within the ARP, then the method proceeds to calculate 243 an Agent Ranking Range using the formula;

$$\text{ARR} = \text{Highest Agent Ranking} - \text{Lowest Agent Ranking} \qquad (5)$$

Next, this Agent Ranking Range is used to calculate a distance adjustment 244 for each agent within the ARP, using the formula:

Adjustment=ARR*PPF*(ARPmax+ClosestDistanceInARR−AgentDistance)/ARPmax,   (6).

This formula uses the Agent Ranking Range (ARR) and the callers Proximity Preference Factor (PPF) to scale the adjustment. The closest agent will receive the largest adjustment. The furthest agent will receive the smallest adjustment.

Once the adjustments have been calculated, the method proceeds to calculate 246 the final ranking of all the agents. This calculation is performed by subtracting each adjustment from the initial ranking determined previously 234.

With the final rankings calculated, the selection ends 250 by selecting 248 the lowest ranking and therefore, the best agent.

Figure 8:
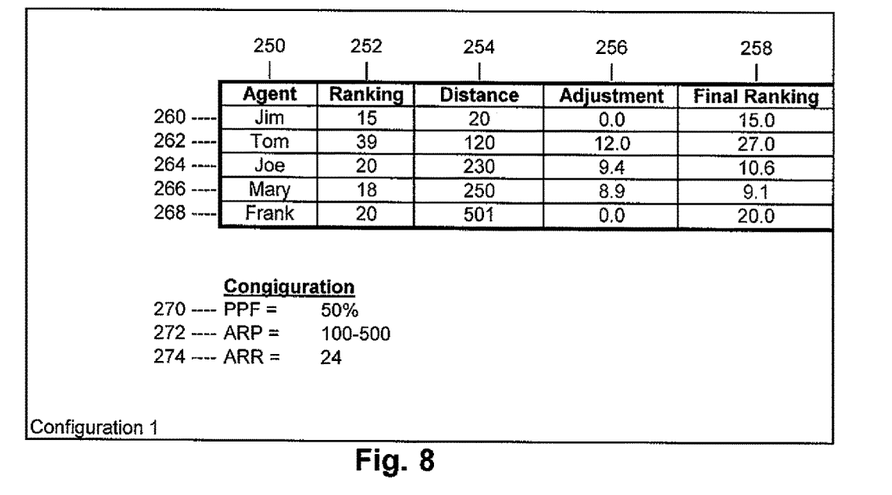
FIG. 8 depicts a first exemplary configuration in accordance with a preferred embodiment of the present invention.

Again, in order to understand the benefits of the method for this preferred embodiment of the invention, several applications of the invention in various caller/agent configurations will now be described. Referring now to FIG. 8, in a first exemplary configuration, the initial ranking 252 of the various agents 260-268 listed in the agent column 250 is determined as listed. Once determined, the PPF 270 and the ARP 272 submitted by the call center application are retrieved. In this case the PPF is 50% and the ARP is 100 to 500. Since the callers PPF (50%) is greater than zero, the distance 254 between the caller and each agent 260-268 is calculated. Finally, the ARR 274 is calculated as the Highest Ranked Agent−Lowest Ranked Agent. In this case, since Tom 262 is the highest ranked agent with a ranking of 39 and Jim 260 is the lowest ranked agent with a ranking of 15, the ARR=39−15=24 (5).

Since three agents, 262-266 are within the ARP range, their rankings must be adjusted using formula (6), as follows to calculate the distance adjustment 256 for each agent 262-266 within the ARP 272 range. Note that agents 260, 268 outside the ARP range receive a 0 adjustment. The adjustment values 256 are then calculated according to formula (6). Tom 262 receives the biggest adjustment, 12, as he is closest to the caller. This figure is arrived at by the following calculation of formula (6):

Adjustment=24*0.50*(500+120−120)/500=12.

The ARR 274 is 24 and the PPF 270 is 0.50 or 50%. The remaining within-range agent adjustments are calculated similarly, with Joe 264 receiving an adjustment of 9.4 and Mary 266 receiving an adjustment of 8.9.

The final rankings 258 for the agents are then calculated by subtracting the adjustment 256 values from the initial ranking 252 values. The resulting final rankings 27.0 for Tom 262, 10.6 for Joe 264, and 9.1 for Mary 266 depict that Mary 266 has the lowest final ranking of 9.1 and is therefore chosen as the best agent.

Figure 9:
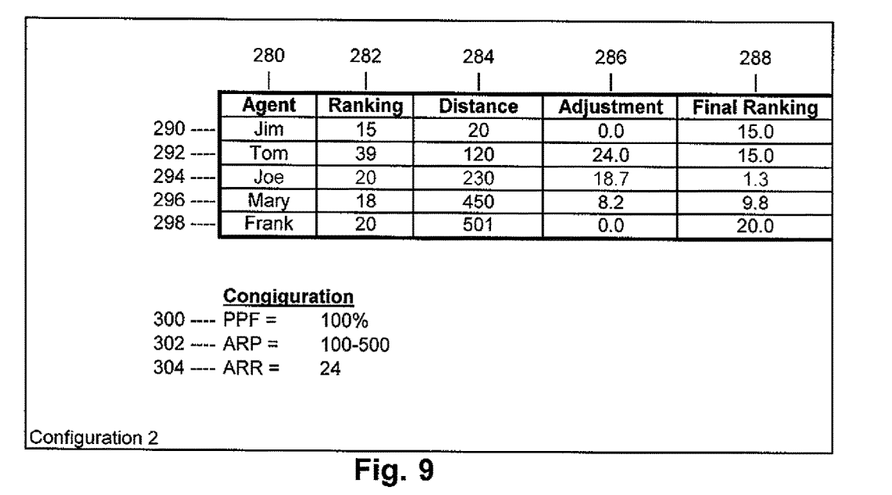
FIG. 9 depicts a second exemplary configuration in accordance with a preferred embodiment of the present invention.

Referring now to FIG. 9, in a second exemplary configuration, the caller's PPF 300 is now set to 100%, indicating that proximity is of utmost importance to the caller. In this case, since the PPF=100%, instead of 50%, the PPF factor in formula (6) equals 1.0, instead of 0.5. Here, the ARP 302 is 100-500 and the ARR 304 is 24. Again, Jim 290 and Frank 298 are outside the ARP 310 range and receive zero adjustments 286. Adjustments 286 of 24 for Tom 292, 18.7 for Joe 294, and 8.2 for Mary 296 are calculated using equation (6). The resulting final rankings 288 of 15.0 for Tom 292, 1.3 for Joe 294, and 9.8 for Mary 296 depict that Joe 294 has the lowest final ranking of 1.3 and is therefore chosen as the best agent. Although Mary 296 has a better initial ranking than Joe 294, Joe is closer than Mary and that is more important to the caller in this exemplary configuration.

Figure 10:
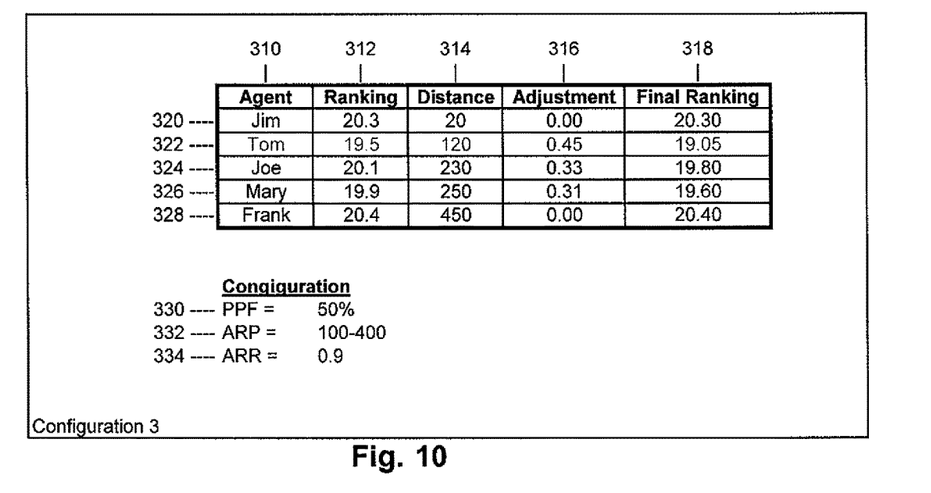
FIG. 10 depicts a third exemplary configuration in accordance with a preferred embodiment of the present invention.

Referring now to FIG. 10, in a third exemplary configuration, the caller's PPF 330 is again set to 50% and the ARP 332 is 100-400. However, the initial ranking 312 for the Agents 310 shows Jim 320 at 20.3, Tom 322 at 19.5, Joe 324 at 20.1, Mary 326 at 19.9, and Frank 328 at 20.4. The ARR 334 is 0.9 determined as the difference between the highest and lowest ranking of 20.4 and 19.5. Since the distances 314 for Jim 320 and Frank 328 are 20 and 450, respectively, and are outside the ARP 332 range of 100 and 400, the adjustment for each of these two agents is set to zero. Equation (6) is then used to calculate the adjustments for the remaining three agents, which results in an adjustment 316 of 0.45 for Tom 322, 0.33 for Joe 324, and 0.31 for Mary 326. The resulting final rankings 318 of 19.05 for Tom 322, 19.8 for Joe 324, and 19.6 for Mary 326 depict that Tom 322 has the lowest ranking and is therefore chosen as the best agent. In this example, Tom had both the best initial ranking and the best adjusted ranking.

Figure 11:
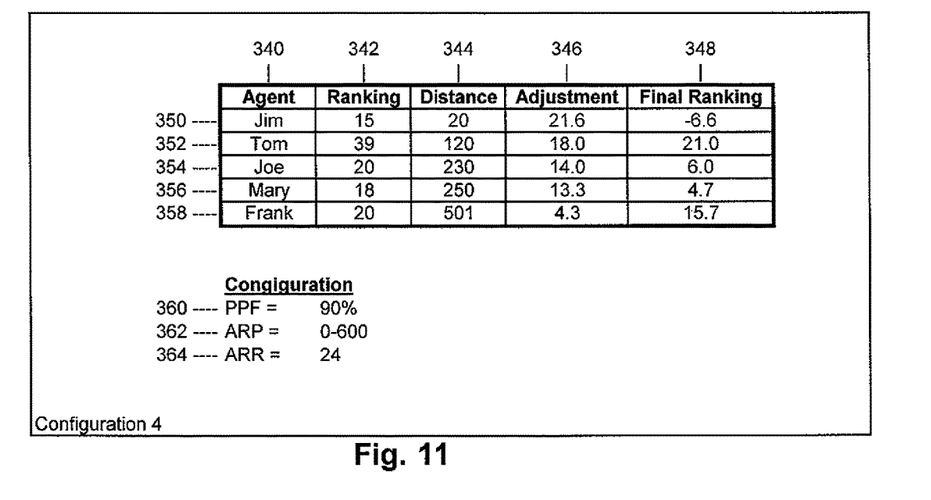
FIG. 11 depicts a fourth exemplary configuration in accordance with a preferred embodiment of the present invention.

Referring now to FIG. 11, a fourth exemplary configuration is shown, which has the same initial ranking 342 and distance 344 for the agents 350-358 as for the first exemplary configuration discussed in FIG. 8. However, here the caller's PPF 360 is now set to 90%, indicating that proximity is of fairly high importance to the caller, the ARP 362 is 0-600, and the ARR 364 is 24. Although this example is much like the first exemplary configuration of FIG. 9, now all five agents 350-358 are within the ARP 362 range and therefore need to be adjusted. In this case, since the PPF=90%, instead of 50%, the PPF factor in formula (6) is set to 0.9. This results in adjustments 346 of 21.6 for Jim 350, 18.0 for Tom 352, 14.0 for Joe 354, 13.3 for Mary 356, and 4.3 for Frank 358. The resulting final rankings 348 of −6.60 for Jim 350, 21.0 for Tom 352, 6.0 for Joe 354, 4.7 for Mary 356, and 15.7 for Frank 358 depict that Jim 350 with and a final ranking 348 of −6.6 has the lowest ranking after adjustment and is therefore chosen as the best agent.

Although embodiments of a method and computer readable medium for various embodiments of geographic agent routing have been described in detail herein, it will be appreciated that the present invention may provide applicable inventive concepts that can be embodied in a wide variety of specific contexts. For example, while the preferred embodiment of the invention has principally referenced a method for optimally routing agents it should be understood that the method may also be utilized for alternative applications, such as selecting particular computers, security systems, imaging systems, and the like. Also, a lesser or greater number of modules or components may be utilized in the system of the present invention to make the selection of the best available agent. The specific embodiments discussed herein are merely illustrative of specific ways to make and use the invention, and do not delimit the scope of the invention. Those skilled in the art will recognize that various substitutions and modifications and a lesser or greater number of modules or components may be utilized in the invention without departing from the scope and spirit of the appended claims.

What is claimed is:

1. A method, comprising:
assigning an agent of a plurality of agents, by a processor, to service a customer by:
calculating an agent range preference by subtracting a minimum distance from one agent to a customer from a maximum distance from another agent to the customer;

calculating an adjusted distance scale by subtracting said minimum distance from the agent range preference;

determining a distance adjustment for an agent within the agent range preference; and calculating a final ranking by subtracting the distance adjustment from an initial agent ranking.

2. The method of claim 1 comprising assigning an agent to service a customer based on an agent distance adjustment being made relative to a closest agent distance prior to assigning an agent to service a customer when said customer specifies an agent range preference.

3. The method of claim 1 comprising receiving a call based on an initial agent ranking of all available agents, a caller's proximity preference factor, and an agent range preference.

4. The method of claim 1 comprising coupling a plurality of incoming customer calls and available agents.

5. The method of claim 1 comprising providing the initial agent ranking based on a dataset including information of at least one from the group of: skill-set, previous interaction with a customer, language capability, race, sex, minimum distance from an agent to a customer, maximum distance from an agent to a customer, and current availability.

6. The method of claim 1, wherein an agent is assigned to service a customer based on the initial agent ranking when said customer specifies no agent range preference indicating distance between said customer and said agent.

7. The method of claim 1, wherein the customer and the assigned agent communicate via at least one of: a landline phone call, an e-mail, a fax, Internet, a wireless phone call, a wireless intercom, and a wireless Internet.

8. The method of claim 1, wherein the minimum distance and the maximum distance are determined using at least one of: an address, a NPA-NXX, a Zip Code, cell cite locations and GPS coordinates.

9. The method of claim 1, wherein the determining the distance adjustment for the agent within the agent range preference occurs by multiplying the agent range preference with a proximity preference factor times a difference between the agent range preference and an agent distance to the customer and dividing by the calculated adjusted distance scale.

10. A non-transitory computer readable medium comprising instructions for:

assigning an agent of a plurality of agents, by a processor, to service a customer by:

calculating an agent range preference by subtracting a minimum distance from one agent to a customer from a maximum distance from another agent to the customer;

calculating an adjusted distance scale by subtracting said minimum distance from the agent range preference;

determining a distance adjustment for an agent within the agent range preference; and calculating a final ranking by subtracting the distance adjustment from an initial agent ranking.

11. The non-transitory computer readable medium of claim 10 comprising assigning an agent to service a customer based on an agent distance adjustment being made relative to a closest agent distance prior to assigning an agent to service a customer when said customer specifies an agent range preference.

12. The non-transitory computer readable medium of claim 10 comprising receiving a call based on an initial agent ranking of all available agents, a caller's proximity preference factor, and an agent range preference.

13. The non-transitory computer readable medium of claim 10 comprising coupling a plurality of incoming customer calls and available agents.

14. The non-transitory computer readable medium of claim 10 comprising providing the initial agent ranking based on a dataset including information of at least one from the group of: skill-set, previous interaction with a customer, language capability, race, sex, minimum distance from an agent to a customer, maximum distance from an agent to a customer, and current availability.

15. The non-transitory computer readable medium of claim 10, wherein an agent is assigned to service a customer based on the initial agent ranking when said customer specifies no agent range preference indicating distance between said customer and said agent.

16. The non-transitory computer readable medium of claim 10, wherein the customer and the assigned agent communicate via at least one of: a landline phone call, an e-mail, a fax, Internet, a wireless phone call, a wireless intercom, and a wireless Internet.

17. The non-transitory computer readable medium of claim 10, wherein the minimum distance and the maximum distance are determined using at least one of: an address, a NPA-NXX, a Zip Code, cell cite locations and GPS coordinates.

18. The non-transitory computer readable medium of claim 10, wherein the determining the distance adjustment for the agent within the agent range preference occurs by multiplying the agent range preference with a proximity preference factor times a difference between the agent range preference and an agent distance to the customer and dividing by the calculated adjusted distance scale.

* * * * *